April 17, 1956  H. J. HALL  2,742,104
AUTOMATIC VOLTAGE CONTROL OF ELECTROSTATIC
PRECIPITATOR WITH SATURABLE REACTOR
Filed Dec. 17, 1953  3 Sheets-Sheet 1
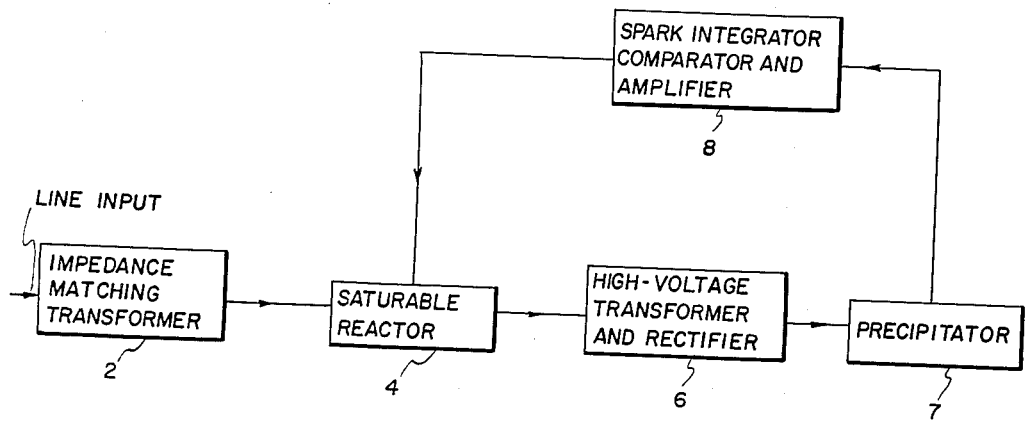
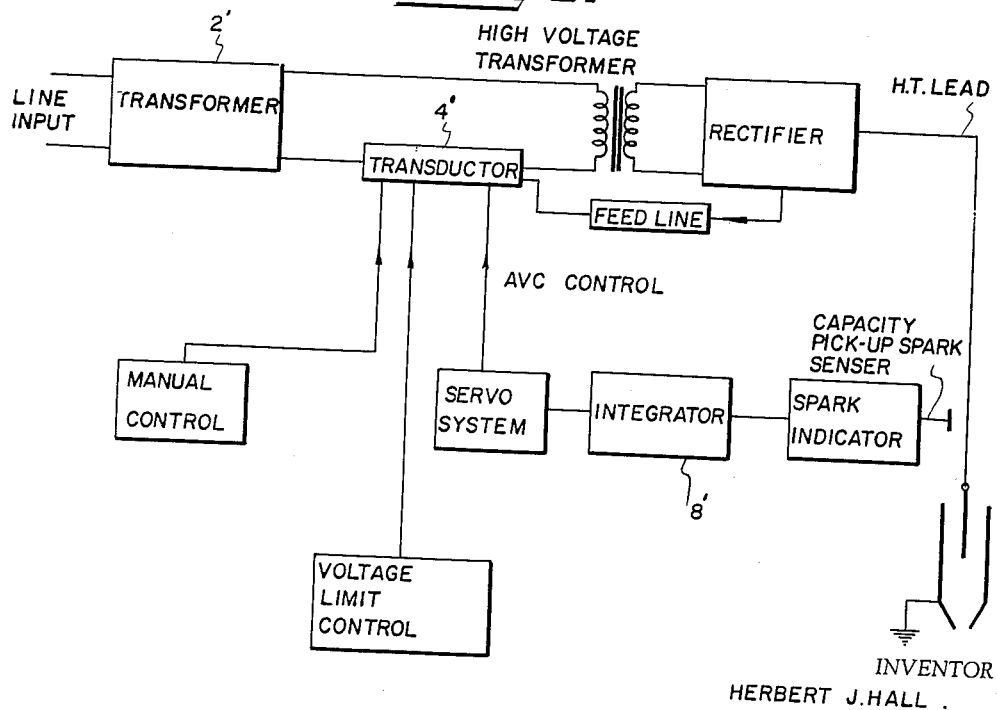
INVENTOR
HERBERT J. HALL
BY Harold T. Stowell
ATTORNEY

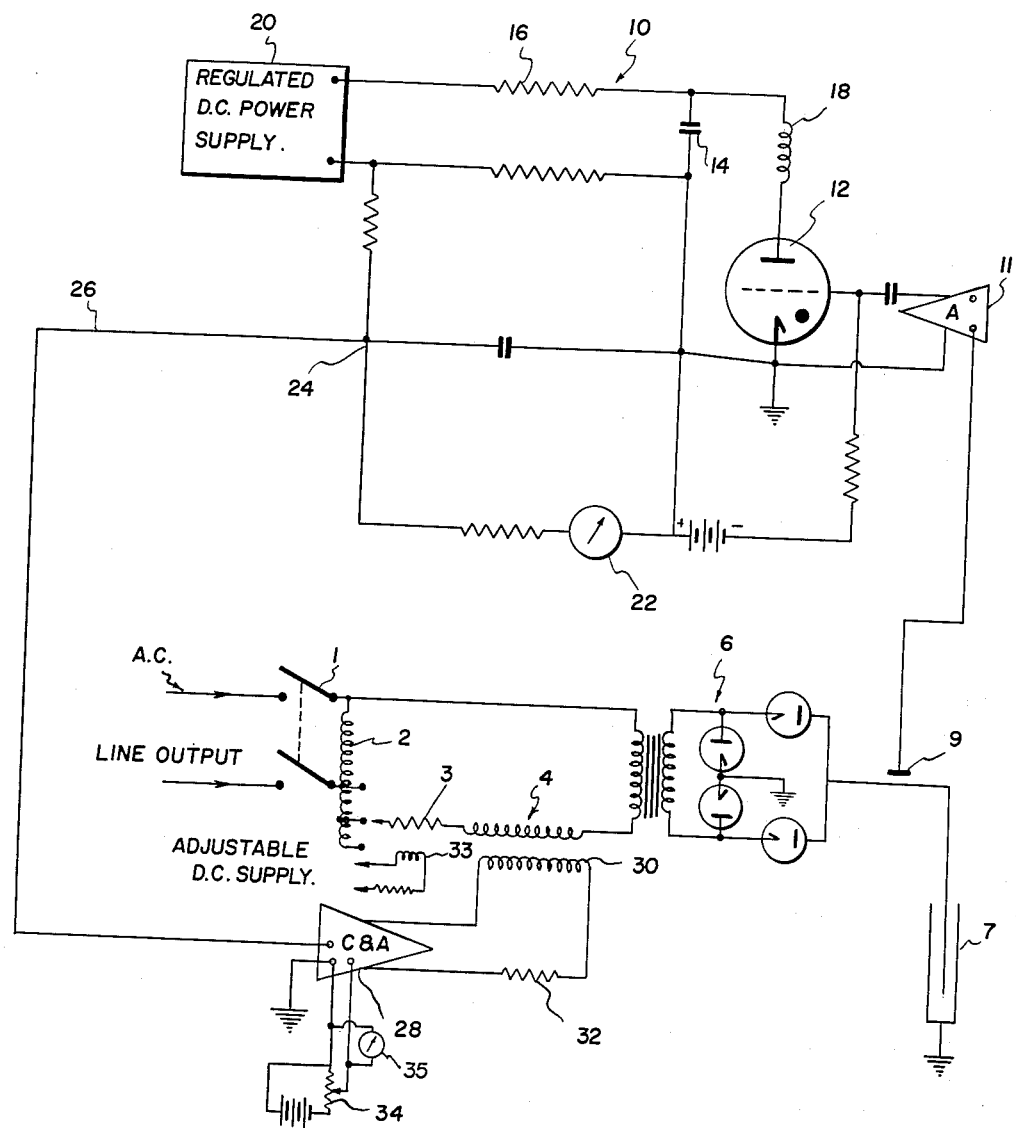

INVENTOR
HERBERT J. HALL.

BY Harold T. Stowell

ATTORNEY

United States Patent Office 2,742,104
Patented Apr. 17, 1956

2,742,104

AUTOMATIC VOLTAGE CONTROL OF ELECTROSTATIC PRECIPITATOR WITH SATURABLE REACTOR

Herbert J. Hall, Hopewell Township, Mercer County, N. J., assignor to Research Corporation, New York, N. Y., a corporation of New York Application December 17, 1953, Serial No. 398,837

9 Claims. (Cl. 183—7)

This invention relates to an improved system for automatically controlling the operating voltage of electrical precipitators and the like in accordance with the rate of sparking between the electrodes of a precipitator, and has for its primary object the provision in such a system of an arrangement for obtaining such automatic control by means of a transductor. A transductor as used herein is defined as a direct-current magnetized alternating-current choke coil and thus includes such devices as saturable reactors and magnetic amplifiers.

A system for automatically controlling the operating voltage of electrical precipitators in accordance with the integrated sparking rate is disclosed in my U. S. patent application for "System for Energizing Electrical Precipitators" filed Mary 15, 1952, Serial No. 287,985, now Patent No. 2,675,092 dated April 13, 1954 of which the present application is in part a continuation.

It is an object of the invention to provide an electrical precipitator voltage control that is simple, extremely rugged and durable under long-continued usage, and has a minimum of moving parts, or even no moving parts.

Still another object is to provide an automatic precipitator voltage control capable of continuous control smoothly through a wide range, and having high circuit efficiency, which is capable of maintaining an optimum average sparking rate so as to achieve at all times and under all operating conditions maximum precipitator collection efficiency.

It is also an object to provide an automatic precipitator control in which the rate of correction is proportional to the deviation of the system from a correct setting, and to provide a system which does not overshoot upon correction, but has an automatic anti-hunt control.

A further object is to provide a system with improved means for automatically correcting for line voltage changes; which has optional manual or automatic control; which uses a minimum of electronic tubes or other limited-life equipment; and which has wide and smooth control range to satisfy any type of precipitator load requirement.

The specific nature of the invention as well as other objects and advantages thereof will clearly appear from a description of a preferred embodiment as shown in the accompanying drawing, in which:

Fig. 1 is a block diagram of a system embodying the invention;

Fig. 2 is a schematic circuit diagram of the system shown in Fig. 1;

Fig. 3 is a block diagram of an alternative form of the invention, embodying a suitable control for the transductor.

Figure 4:
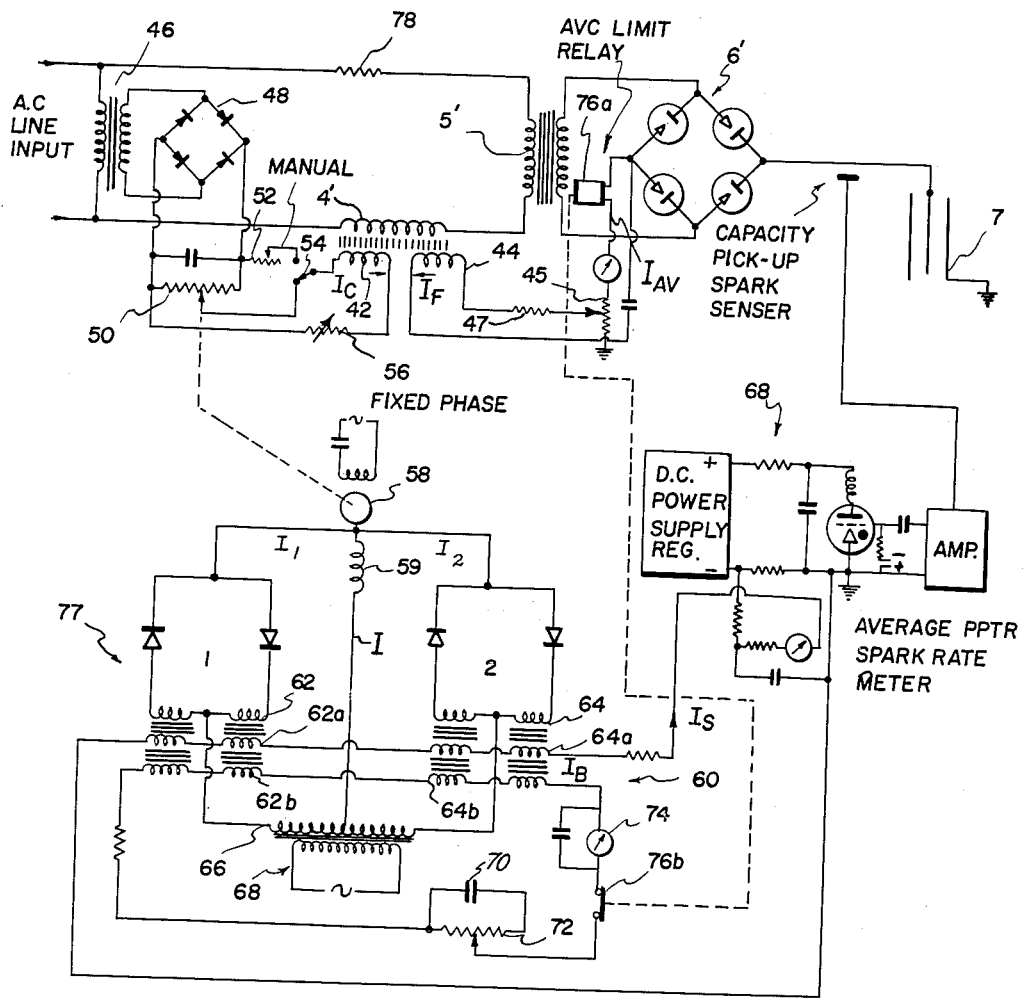
Fig. 4 is a circuit diagram of a system shown in Fig. 3.

Referring to Fig. 1, wherein the system is shown in block diagram form, the input from an ordinary 60-cycle line is fed through a suitable impedance matching transformer 2 to a saturable reactor 4, the output of which is passed to high voltage transformer and rectifier system 6 which supplies precipitator 7. Sparking impulses from the precipitator are picked up by any suitable means, such as a capacity pick-up, as shown in my above referred to copending application, and fed to an amplifying and spark integrating system 8, which may be similar to that shown in my above referred to application. The direct current output of the amplifier is in turn fed back to the D.-C. control winding of saturable reactor 4 in such fashion that the output of the saturable reactor and hence the precipitator operating voltage is controlled in accordance with the integrated sparking rate, which is the desired result.

A circuit arrangement corresponding to Fig. 1 is shown in Fig. 2. The alternating current line input is fed through a suitable main switch 1 to impedance matching transformer 2, which may conventionally be an auto transformer. The auto-transformer output is fed through a current limiting resistor 3 and the alternating current winding of saturable transformer 4 to the high voltage transformer and rectifier system 6, which may be of any suitable or conventional design. The rectified high voltage output is fed to precipitator 7. When sparking occurs between the precipitator electrodes, a pulse is picked up by capacitive pick up 9 and fed through amplifier 11 to spark integrator and rate meter system 10, which may be essentially the same as that shown in my prior copending application. When the precipitator sparks, the transient voltage pulse detected by pick up 9 is amplified at 11 to provide a positive pulse of sufficient amplitude to overcome the grid bias voltage of thyratron 12 and thereby cause the thyratron to conduct. Condenser 14, which has been previously charged to the D.-C. power supply level through resistor 16, now discharges through the thyratron via inductance 18. After the discharge the thyratron quickly becomes non-conducting again and condenser 14 is recharged from D.-C. source 20. Inductance 18 is used to limit the peak discharge current through the thyratron to a value consistent with tube ratings and also to cause the voltage across condenser 14 to reverse polarity by the end of the discharge to assist in rapidly deionizing the thyratron. Thus, for each spark in the precipitator, a certain fixed charge is transferred from current source 20 to condenser 14. This charge multiplied by the average number of sparks occurring in a second is the average condenser charging current which is indicated by meter 22. The R-C network associated with meter 22 constitutes an integrating circuit which smooths out the individual current pulses charging condenser 14 so that a steady indication on meter 22 is obtained. A voltage corresponding to this indication is picked off at point 24 and fed by means of conductor 26 to a comparator and D.-C. amplifier 28, whose output supplies the control current to the D.-C. control winding 30 of saturable reactor 4. (An additional D.-C. control bias winding 33 energized from an adjustable D.-C. supply can conveniently be used to set the general level of operation.) If the sparking rate is too low, then the current fed to D.-C. control winding 30 is such as to permit sufficient alternating current to flow through the A.-C. winding of saturable reactor 4 so that the direct current high voltage output to the precipitator is raised, thereby increasing the sparking rate. As the sparking rate increases, the control current supplied to winding 30 decreases correspondingly, the direction of control being such that the primary supply to transformer 5 is curtailed until the desired sparking rate is obtained, which may be set to any given value indicated by meter 35 by any suitable control means such, for example, as control potentiometer 34. It will thus be seen that each setting of the control device 34 corresponds to a desired sparking rate, and that this sparking rate, once set, will be maintained by the system.

It will be noted that the above described system contains no moving parts and provides substantially instantaneous control of the sparking rate continuously integrated over a period determined by the constants of the integrating network.

Fig. 3 is a block diagram of an alternative form of control system. The block diagram is self-explanatory. It shows a servo-system between integrating network 8' and the saturable transformer 4'. In addition, a manual control and an automatic voltage limit control are provided.

Fig. 4 shows a circuit diagram corresponding to the block diagram of Fig. 3. This system is designed for full range control for any type of precipitator load, including those which may be subject to frequent and very wide fluctuations in operating conditions, for example, cupola or sintering machine precipitator applications, as well as fly ash precipitators. The main control element is a transductor of saturable reactor type 4' in series with the primary of the high voltage transformer 5'. By way of illustration, a full-wave vacuum tube bridge rectifier 6' is shown with a single output feeding the precipitator 7 in the conventional manner. It is clear that two half-wave outputs could also be used each connected to a separate precipitator section. In this case two spark sensing capacity pick-up arrangements would be used. The alternating current impedance of the transductor and hence the voltage delivered to the primary of the high voltage transformer is controlled by the direct current in the control coils of which there are two. One is the principal control coil 42 with current Ic; the other is a feedback winding 44 carrying a portion of the rectified output current IF arranged to oppose the magnetization caused by Ic. This constitutes negative feedback which improves the stability, speed of response, and acts as a damping circuit to prevent hunting. The amount of feedback is controlled by the relative number of ampere-turns on the control and feedback circuits and also on the setting of potentiometer 45 together with the effective series resistance 47. The control direct current Ic is supplied, for example, from a transformer 46 and selenium bridge rectifier 48 either via potentiometer 50 for automatic control or via a series rheostat 52 for manual control. Selection of either type of control is obtained by the switch 54. The forcing resistance 56 is used to adjust the speed of response which increases for larger values of this resistor.

Potentiometer 50 is operated by the reversing servo-motor 58, generally through appropriate reduction gearing (not shown). The controlled phase 59 of the servo-motor is energized by alternating current I derived from a conventional magnetic amplifier 60 of the push-pull, self-saturating, half-wave voltage doubler type 77 connected as shown. Magnetic amplifier units 62 and 64 are fed from a center-tapped alternating current transformer 66 whose primary is connected to the line source 68—typically 115 volts, 60 cycles, to which the fixed phase of the servo-motor is also connected in series with a capacitor in the usual manner.

Magnetic amplifiers 62 and 64 are equipped with two control windings. Windings 62a and 64a carry a direct current Is proportional to the average precipitator sparking rate derived, for example from the electronic integrator and spark indicator system 68 very similar to that previously described. The other control windings 62b and 64b are supplied with direct current IB in the opposite sense to Is, derived from any suitable source such as battery 70. Magnetic amplifiers 62 and 64 are sensitive to the direction and magnitude of the net control currents Is and IB.

When the net control current is zero—i. e., $I_S = I_B$ or when both Is and $I_B = 0$, currents I1 and I2 are equal and in opposite phase so that I also equals zero and the servo-motor remains stationary. If Is is greater than IB and the magnetic amplifier coils are arranged so that a net control current from left to right will be such as to aid the direct current self-saturation supplied by the rectifiers in magnetic amplifier 62 and to oppose the self-saturation of the core caused by the rectified alternating current in magnetic amplifier 64, the core of magnetic amplifier 62 will become more saturated than that of 64, and hence the impedance of the alternating current windings in 62 will be less than those in 64 so that I1 will be greater than I2, and $I = I_1 - I_2$ will flow in the control winding 59 of the servo-motor 58 to rotate the shaft and the arm of potentiometer 50 in the direction to decrease the main control current Ic and hence to lower the precipitator voltage. If IB is greater than Is the net control current will flow in the opposite direction and reverse the process so that I2 will be greater than I1. The current $I = I_2 - I_1$ will now energize the servo-motor control winding in the opposite phase so as to reverse its direction of rotation and thus increase the main control current Ic and thereby increase the precipitator voltage. The speed of the servo-motor 59 is a function of the magnitude of the current I and therefore depends on the magnitude of the difference between Is and IB. It is thus clear that the action of the system is to maintain the precipitator voltage so that $I_S = I_B$. It is also clear that the rate of correction varies directly with the difference between Is and IB.

IB is adjusted by means of potential divider 72 to correspond to the desired sparking rate as indicated on the current meter 74. The system then automatically adjusts the main control current Ic so that the desired sparking rate is continuously maintained.

The AVC limit relay 76a and 76b may be used to prevent the rectifier current Iav from exceeding the ratings of the precipitator power supply. In those cases where the full rated output can be used without causing precipitator sparking, the servo system will increase precipitator power until rated Iav flows whereupon the limit relay will be energized and its contacts at 76b shown connected in series with IB will open and thus stop the servo-motor at the point where maximum power available is being used in the precipitator. If at some later time the precipitator load conditions should change so that excessive sparking occurred, the system would lower the voltage to the point where the desired rate is maintained.

The magnetic amplifiers used in the servo-system are well known and can be purchased to specifications as a commercial item, complete with appropriate self-saturating dry rectifiers of the selenium type, for example. Likewise, suitable reversing servo-motors are commercially available. It is also clear that a direct current reversing motor of conventional type could be used in place of the alternating current type illustrated. In this case, the push-pull magnetic amplifiers would be arranged to provide direct outputs to energize split field windings, for example.

The optimum design of the system requires a special main transductor in series with the high voltage transformer. Although any direct current controlled reactor of conventional type having proper power ratings might be used, an arbitrary unit typically requires substantial series resistance 78 in order to control satisfactorily line current transients due to precipitator sparking and to keep transient currents within the ratings of the high voltage rectifier tubes. This results in limiting the available control range as well as some power losses and extra cost. In addition, an important circuit requirement for best operation is that the recovery time of the saturable reactor 4' after a spark be short enough so that voltage on the precipitator can return to normal value without excessive delay. Recovery times substantially less than 0.1 second are desirable in most cases.

It is obvious that instead of a potentiometer on the output of the direct current supply for Ic, the servo-motor could be used to drive a variable auto-transformer or induction regulator in the primary of the supply transformer 46. The use of an induction regulator, for example, would eliminate any problem of brush wear and for that reason might be preferred.

It will be apparent that the embodiments shown are only exemplary and that various modifications can be made in construction and arrangement within the scope of my invention as defined in the appended claims.

I claim:

1. A device for energizing the electrodes of an electrical precipitator comprising a high tension transformer, a transductor having an alternating current winding in circuit with the primary of said transformer and having a direct current control winding, a device responsive to disturbances in the system caused by an interelectrode spark, a pulsing circuit for producing a pulse for each incidence of said disturbance, an electrical integrating circuit for integrating said pulses to provide an electric output which is a function of the integrated or average pulse rate, and means for controlling said direct current control winding in accordance with said electrical output, whereby the energization of the precipitator electrodes is controlled by the integrated sparking rate.

2. The invention according to claim 1, said electrical output being direct current, and said means for controlling said direct current control windings comprising means for supplying said direct current output to said control windings.

3. A system for energizing the electrodes of an electrical precipitator comprising a high tension transformer, a transductor having an alternating current winding in circuit with the primary of said transformer and having a direct current control winding, a rectifier connected in the secondary circuit of said transformer, and a precipitator supplied by the output of said rectifier, a spark sensing device associated with said precipitator for sensing disturbances in the system caused by an interelectrode spark, a pulsing circuit for producing a pulse for each incidence of said disturbance, an electrical integrating circuit for integrating said pulses to provide an electrical output which is a function of the integrated pulse rate, and means for controlling said direct current control winding in accordance with said electrical output, whereby the energization of the precipitator electrodes is controlled by the integrated sparking rate, said means for controlling the direct current control winding comprising a magnetic amplifier having its input controlled by the output of said integrating circuit and its output arranged to control the input to said direct current control winding.

4. A system for energizing the electrodes of an electrical precipitator comprising a high tension transformer, a transductor having an alternating current winding in circuit with the primary of said transformer and having a direct current control winding, a rectifier connected in the secondary circuit of said transformer, and a precipitator supplied by the output of said rectifier, a spark sensing device associated with said precipitator for sensing disturbances in the system caused by an interelectrode spark, a pulsing circuit for producing a pulse for each incidence of said disturbance, an electrical integrating circuit for integrating said pulses to provide an electrical output which is a function of the integrated pulse rate, and means for controlling said direct current control winding in accordance with said electrical output, whereby the energization of the precipitator electrodes is controlled by the integrated sparking rate, said means for controlling the direct current control winding comprising a magnetic amplifier having its input controlled by the output of said integrating circuit and its output arranged to control the input to said direct current control winding, said last arrangement comprising a direct current supply device having adjustable control means for controlling the input to said direct current control winding, and a reversible motor device energized by the output of said magnetic amplifier for adjusting said control means.

5. The invention according to claim 4, a second manually adjustable control means for controlling the output to said direct current control winding and selective switching means for selectively operatively associating said direct current control winding with either of said adjustable control means.

6. The invention according to claim 5, a second direct current control winding for said transductor supplied through a variable control device by said rectifier for negative feedback.

7. The invention according to claim 6 and an automatic-voltage-control limit relay in the precipitator supply circuit arranged to prevent said magnetic amplifier from increasing the precipitator voltage above that which provides a predetermined maximum precipitator current level and to restore voltage-increase control by said magnetic amplifier at a lower precipitator current level.

8. The invention according to claim 7 and an adjustable circuit control device in circuit with said magnetic amplifier for setting the operating range of said amplifier to determine the spark rate control setting.

9. The invention according to claim 8 and a meter in circuit with said adjustable circuit control device for indicating the setting of said device.

References Cited in the file of this patent

UNITED STATES PATENTS

| | | |
|---|---|---|
| 2,632,522 | Fields | Mar. 24, 1953 |
| 2,675,092 | Hall | Apr. 13, 1954 |